US006959417B2

(12) United States Patent
Gupta

(10) Patent No.: US 6,959,417 B2
(45) Date of Patent: Oct. 25, 2005

(54) QUESTION AND ANSWER GENERATOR

(75) Inventor: Arun P. Gupta, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 745 days.

(21) Appl. No.: 09/871,422

(22) Filed: May 30, 2001

(65) Prior Publication Data

US 2002/0184265 A1 Dec. 5, 2002

(51) Int. Cl.[7] .............................................. G06F 17/00
(52) U.S. Cl. ...................................... 715/513; 707/103
(58) Field of Search ................................ 715/513, 530; 707/3, 104.1, 103; 717/144; 345/853; 434/362

(56) References Cited

U.S. PATENT DOCUMENTS

| | | | | |
|---|---|---|---|---|
| 6,028,601 | A * | 2/2000 | Machiraju et al. | 345/705 |
| 6,112,049 | A * | 8/2000 | Sonnenfeld | 434/350 |
| 6,175,833 | B1 * | 1/2001 | West et al. | 707/102 |
| 6,315,572 | B1 * | 11/2001 | Owens et al. | 434/322 |
| 6,418,446 | B1 * | 7/2002 | Lection et al. | 707/103 R |
| 6,519,617 | B1 * | 2/2003 | Wanderski et al. | 715/513 |
| 6,685,482 | B2 * | 2/2004 | Hopp et al. | 434/323 |

* cited by examiner

*Primary Examiner*—Sanjiv Shah
(74) *Attorney, Agent, or Firm*—Gunnison, McKay & Hodgson, L.L.P.

(57) ABSTRACT

The present invention provides an automated solution for generating a question document and an answer document from a database of questions and answers. The solution utilizes an extensible markup language to define the database. The database is then converted into a first Document Object Model (DOM) tree. The first DOM tree may then be used in prompting a user to enter the number of questions from each section to be generated. Once this input is received, nodes from the first DOM tree are randomly selected using the data received from the input. These randomly selected nodes are then used to create a second DOM tree representing the quiz or test. This second DOM tree may then be converted to a readable or printable format using a transformation, such as an stylesheet language transformation.

13 Claims, 5 Drawing Sheets

QUESTION AND ANSWER GENERATOR

FIELD OF THE INVENTION

The present invention relates to quizzes and tests. More specifically, the present invention relates to the use of computer software to automatically select questions and answers for quizzes and tests.

BACKGROUND OF THE INVENTION

Quizzes and tests are common in academic settings. However, they are becoming more common in the workplace as well. One area in which they have gained in importance is in recruitment, especially for jobs requiring a large number of employees having considerable technical skills, such as engineers or computer programmers. In those areas, quizzes and tests may be used to ensure that the applicant pool has sufficient technical qualifications before applying human resource time to interviewing the candidates.

Since businesses are joining academicians as test-givers, unsurprisingly there is an increased emphasis placed on cost-efficiency in the creation of tests and quizzes. While the time it takes a person to choose a set of questions from a large repository of ready-made questions may be adequate for academia, that person's time may be far more valuable in the business setting. Thus, businesses have sought to automate this selection process.

One way to automate the process is to simply randomly pick questions from a database of questions. For example, a Star Office™ (created by Sun Microsystems, Inc. of Palo Alto, Calif.) document storing the database of questions may be accessed, with random questions being selected using a random number generator in a conventional manner. A drawback of this method, however, is that it does not provide for sections within the database, without the random question picking program knowing ahead of time what sections exist in the database. For example, a database of standardized high school test questions may be divided into "English" and "Math" sections, with the program picking a certain number of random "English" questions and a certain number of random "Math" questions. This, however, forces the program to be aware of the section when the program is created, limiting its portability. In essence, each time a new type of test is created the program must be redesigned.

Furthermore, computerized testing programs in the past have focused on the case where the testee is taking the test on the computer, leaving largely unexamined the case where the computer is merely a tool for the tester in the creation of written tests. For example, in the case where written tests are to be prepared, it is often preferable to not only randomly generate tests, but to also make corresponding answer keys for the tester to use in grading the test. Previous solutions have not examined how to integrate this need into the computerized system, as such answer keys are unnecessary when the testee takes the test on the computer.

What is needed is a solution which allows a portable test generation program to dynamically generate written tests and answer keys on-the-fly.

BRIEF DESCRIPTION OF THE INVENTION

The present invention provides an automated solution for generating a question document and an answer document from a database of questions and answers. The solution utilizes an extensible markup language to define the database. The database is then converted into a first Document Object Model (DOM) tree. The first DOM tree may then be used in prompting a user to enter the number of questions from each section to be generated. Once this input is received, nodes from the first DOM tree are randomly selected using the data received from the input. These randomly selected nodes are then used to create a second DOM tree representing the quiz or test. This second DOM tree may then be converted to a readable or printable format using a transformation, such as an stylesheet language transformation.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
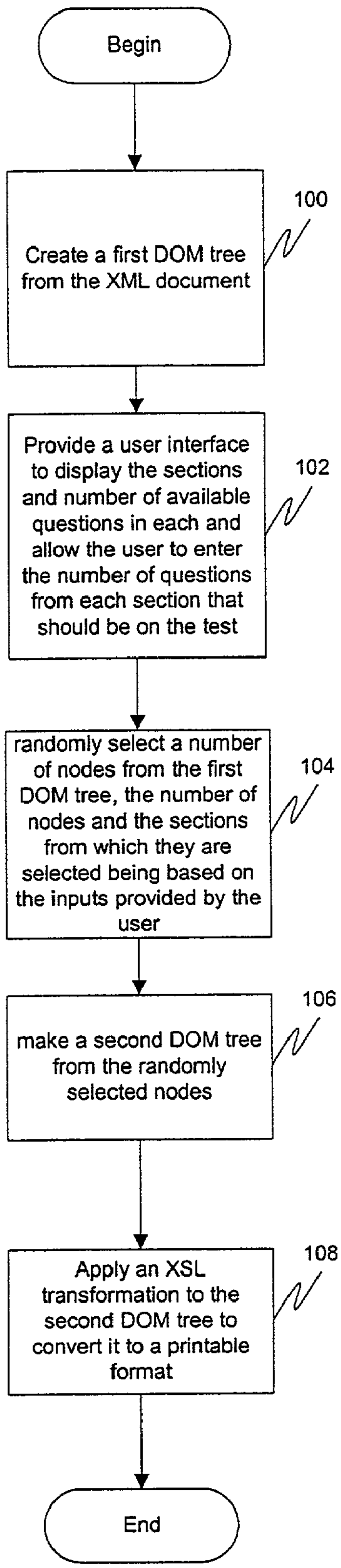
FIG. 1 is a flow diagram illustrating a method for generating a question document and an answer document from a database of questions and answers in accordance with a specific embodiment of the present invention.

Embodiments of the present invention are described herein in the context of a system of computers, servers, communication mechanisms, and tags. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention utilizes an extensible markup language to maintain a question bank, generates a Document Object Model (DOM) tree from the question bank, randomly selects nodes from the DOM tree to create another DOM tree, and then converts the second DOM tree into a printable file. This allows the program to accept a wide variety of different types of question banks without the need for reprogramming.

An extensible markup language is any markup language where the programmer may define tags. These tags are often defined in a document type definition (DTD). The Extensible Markup Language (XML) standard is the most common type of extensible markup languages, but one of ordinary skill in the art will recognize that others may exist either now or in the future and these other extensible markup languages may be used with the present invention rather than XML. Nevertheless, through much of this specification, XML will be assumed to be the language of choice.

FIG. 1 is a flow diagram illustrating a method for generating a question document and an answer document from a database of questions and answers in accordance with a specific embodiment of the present invention. The database of question and answers may be in XML format. A DTD may be defined to define the XML document. It is possible to convert a Star Office™ or other word processing document to an XML document rather than create the XML document from scratch if that is desired. The DTD will be discussed in more detail later in this application.

At 100 in FIG. 1, the system creates a first DOM tree of the entire question bank. This may be accomplished using a parsing tool, such as Java Application Program Interface for XML Parsing (JAXP). At 102, a user interface may then be provided to display the sections and the number of available questions in each and allow the user to enter the number of questions from each section that should be on the test.

At 104, the system randomly selects a number of nodes from the first DOM tree. The number of nodes and the sections from which they are selected are based on the inputs provided by the user in 102. At 106, the system makes a second DOM tree from the randomly selected nodes. This second DOM tree represents the final question and answer sheet. However, since it is unlikely that a user will wish to use the second DOM tree directly, a stylesheet language transformation, such as an Extensible Stylesheet Language (XSL), transformation may be applied to the second DOM tree at 108, which converts it to a more user-friendly and printable format, such as Hypertext Markup Language (HTML) or other web presentation language. Other types of refinement are possible as well.

An example is provided herein showing how the method is applied to an XML document. This example should not be read to be limiting. However, certain elements within the example may be independently patentable and the example should not be read as showing obvious variations of the invention.

An XML DTD may be used to define the format of the XML document containing the questions and answers. The DTD separates the questions/answers into various sections. Furthermore, the DTD creates the question as an element, and the answer to that question as an attribute to the question element. This allows the question and answer to exist as a single data structure, thus avoiding complications wherein an answer may be misidentified with the wrong question. This DTD is as follows:

```
<?Xml version="1.0" standalone="no"?>
<!DOCTYPE WRITTEN-TEST[
<!ELEMENT WRITTEN-TEST (INSTRUCTIONS, ALL,-
  QUESTIONS)>
<!ATTLIST SECTION INCLUDE CDATA #REQUIRED>
<!ATTLIST SECTION PICK CDATA #REQUIRED>
<!ELEMEXT HEAD (TITLE, CONTENTS)>
<!ELEMENT TITLE (#PCDATA)>
<!ELEMENT CONTENTS (#PCDATA)>
<!ELEMENT BODY (QUESTION)*>
<!ELEMENT QUESTION (STATEMENT, OPTIONS)>
<!ELEMENT STATEMENT (DESCRIPTION | CODE |
  CHOIC8)+>
<!ELEMENT OPTIONS (OPTION-1, OPTION-2,
  OPTION-3?, OPTION-4?, OPTION-5?, OPTION-6?)>
<!ELEMENT DESCRIPTION (#PCDATA)>
<!ELEMENT CODE (CODE-LINE)*>
<!ELEMENT CODE-LINE (#PCDATA)>
<!ELEMENT CHOICE (CHOICE-LINE)*>
<!ELEMRNT CHOICE-LINE (#PCDATA)>
<!ELEMENT OPTION-1 (#PCDATA)>
<!ATTLIST OPTION-1 CORRECT CDATA #IMPLIED>
<!ELEMENT OPTION-2 (#PCDATA)>
<!ATTLIST OPTION-2 CORRECT CDATA #IMPLIED>
<!ELEMENT OPTION-3 (#PCDATA)>
<!ATTLIST OPTION-3 CORRECT CDATA #IMPLIED>
<!ELEMENT OPTION-4 (#PCDATA)>
<!ATTLIST OPTION-4 CORRECT CDATA #IMPLIED>
<!ELEMENT OPTION-5 (#PCDATA)>
<!ATTLIST OPTION-5 CORRECT CDATA #IMPLIED>
<!ELEMENT OPTION-6 (#PCDATA)>
<!ATTLIST OPTION-6 CORRECT CDATA #IMPLIED>
]>
```

In accordance with the above DTD, an XML document containing the database of questions and answers may be provided as follows:

```
<WRITTEN-TEST>
<INSTRUCTIONS>
<INSTR-LINR>Please do not write on this booklet</IN-
  STR-LINE>
<INSTR-LINE>Choose one correct answer, unless other-
  wise specified</INSTR-LINE>
<INSTR-LINE>Mark your answers on the answer booklet
  provided</INSTR-LINE>
<INSTR-LINE>Source code in question statements is
  marked as a numbered sequence</INSTR-LINE>
<INSTR-LINE>Write your name, e-mail address and con-
  tact phone number on the answer booklet</INSTR-
  LINE>
<INSTR-LINE>Correct answers carry TWO marks</IN-
  STR-LINE>
<INSTR-LINE>Wrong answers carry ONE NEGATIVE
  mark</INSTR-LINE>
<INSTR-LINE>Duration 1 hour</INSTR-LINE>
</INSTRUCTIONS>
<ALL-QUESTIONS>
<SECTION NAME="BASIC-JAVA" INCLUDE="YES"
  PICK="20">
<HEAD>
<TITLE>Java Programming</TITLE>
```

```
<CONTENTS>Basic Java Concepts</CONTENTS>
</HEAD>
<BODY>
<QUESTION>
<STATEMENT>
<DESCRIPTION>
Which of the following signatures is valid for the main( )method entry point of an application?
</DESCRIPTION>
</STATEMENT>
<OPTIONS>
<OPTION-1>public static void main0</OPTION-1>
<OPTION-2 CORRECT="TRUE">public static void main (String arg[])</OPTION-2>
<OPTION-3>public void main(String [ ] arg)</OPTION-3>
<OPTION-4>public static int main(String [ ] arg)</OPTION-4>
</OPTIONS>
</QUESTION>
. . . ALL THE QUESTIONS/ANSWERS GO HERE
<QUESTION>
<STATEMENT>
<DESCRIPTION>
What will be output of the following code?
</DESCRIPTION>
<CODE>
<CODE-LINE>main( )(</CODE-LINE>
<CODE-LINE>int i=2;</CODE-L1NE>
<CODE-LINE>char* foo="bar";</CODE-LINE:>
<CODE-LINE>printf("% c", foo[i]),</CODE-LINE>
<CODE-LINE>)</CODE-LINE>
</CODE>
</STATEMENT>
<OPTIONS>
<OPTION-1>Will throw a core dump</OPTXON-1>
<OPTION-2 CORRECT="TRUE">Compilation Error</OPTION-2>
<OPTION-3>r</OPTION-3>
<OPTION-4>a</OPTION-4>
</OPTIONS>
</QUESTION>
</BODY>
</SECTION>
</ALL-QUESTIONS>
</WRITTEN-TEST>
```

A first DOM tree may then be created from this XML document. The XML document above is shortened due to space constraints, but it otherwise would contain 5 sections, entitled "BASIC-JAVA", "ENTERPRISE-JAVA", "GUI-JAVA", "SHELL-SCRIPTS-QA", and "CPLUSPLUS-PROGRAMMING". "BASIC-JAVA" has 82 possible questions, "ENTERPRISE-JAVA" has 13 possible questions, "GUI-JAVA" has 14 possible questions, "SHELL-SCRIPTS-QA" has 27 possible questions, and "CPLUSPLUS-PROGRAMMING" has 30 possible children. What follows is a streaming output of the process of converting the XML document to the first DOM tree:

```
+export JAVA__HOME=/usr/local/java/jdkl.3/solaris
+export JAVA=/usr/local/java/jdkl.3/solaris/bin/java
+export JAVA=/usr/local/java/jdkl.3/solaris/bin/javac
++pwd
CURRENT DIR=/home/arung/workarea/J1/jaxp
+echo/home/arung/workarea/jl/jaxp /home/arung/workarea/jl/jaxp+export
CLASSPATH=.
:/home/arung/workarea/j1/jaxp/lib/jaxp.jar:/home/arung/workarea/j1/jaxp/lib/crimson.jar:/home/arung/workarea/j1/jaxp/lib/xalan.jar:/usr/local/java/jdkl.3/solaris/
lib/tools.jar
+export JAVA-FLAGS=–classpath
__:/home/arung/workarea/j1/jaxp/lib/jaxp.jar:/home/arung/workarea/j1/jaxp/lib/crimson__jar:/home/arung/workarea/j1/jaxp/lib/xalan-jar:/usr/local/java/jdkl.3/solaris/lib/tools.jar+export JAVAC__FLAGS=–d. –class-path
.:/home/arung/workarea/j1/jaxp/lib/jaxp.jar:/home/arung/workarea/j1/jaxp/lib/crimson.jar:/ home/arung/workarea/jl/jaxp/lib/xalan-jar:/usr/local/java/jdkl.3/solaris/lib/tools.jar+echo Cleaning . . .
Cleaning . . .
+/bin/rm –rf exam
+echo Building . . .
Building . . .
+/usr/local/java/jdkl.3/solaris/bin/javac –d –classpath
.:/home/arung/workarea/jl/jaxp/lib/jaxp.jar:/home/arung/workarea/j1/jaxp/lib/crimson.jar:/ home/arung/workarea/j1/jaxp/lib/xalan.jar:/usr/local/java/jdkl.3/solaris/lib/tools. jar src/GUI.java src/DOMEcho.java
+echo Running . . .
Running . . .
+/usr/local/java/jdkl.3/solaris/bin/java –classpath
.: /home/arung/workarea/j1/jaxp/lib/jaxp.jar: /home/arung/workarea/j 1/jaxp/lib/crimson.jar:/home/arung/workarea/j1/jaxp/lib/xalan.jar;/usr/local/java/jdkl.3/ solaris/lib/tools.jar exam.GUI
jsw__test.xml jsw__test.xsl jsw__answer.xsl
Getting section count . . .
There are 5 sections
Got section count as 5
Getting section labels
0th section's name is BASIC-JAVA
1th section's name is ENTERPRISE-JAVA
2th section's name is GUI-JAVA
3th section's name is SHELL-SCRIPTS-QA
4th section's name is CPLUSPLUS-PROGRAMMING
Got section labels as
0th section label; BASIC-JAVA
1th section label: ENTERPRISE -JAVA
2th section label: GUI-,JAVA
3th section label: SHELL-SCRIPTS-QA
4th section label: CPLUSPLUS-PROGRAMMING
Getting Questions in a section
There are total of 5 sections
82 children of 1th section
13 children of 2th section
14 children of 3th section
27 children of 4th section
30 children of 5th section
Getting total questions in all sections
There are total of 5 sections
```

Figure 2:
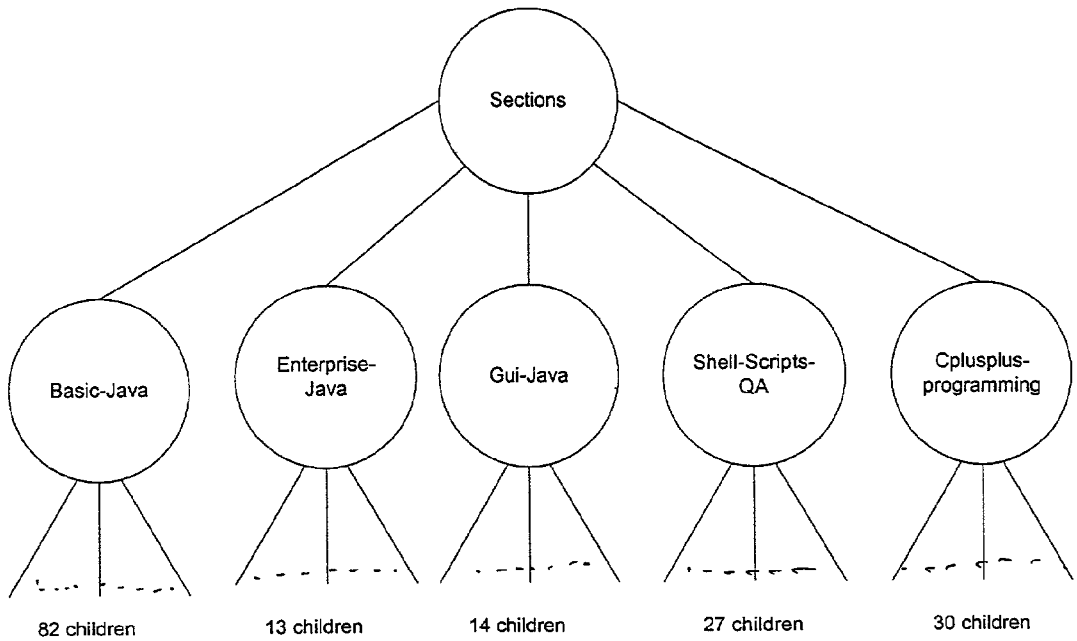
FIG. 2 is a diagram illustrating an example of a first Document Object Model (DOM) tree in accordance with a specific embodiment of the present invention.
Figure 3:
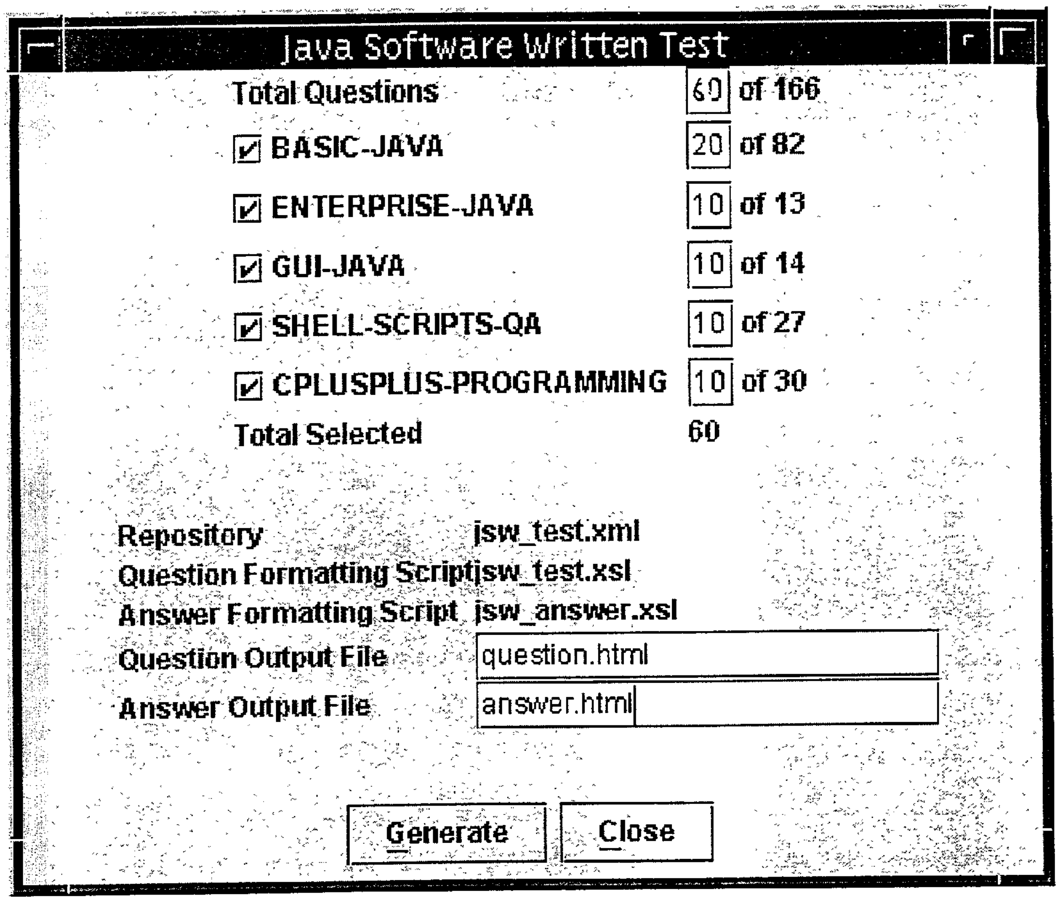
FIG. 3 is a diagram illustrating a screen capture of a user interface in accordance with a specific embodiment of the present invention.

This creates a first DOM tree, as depicted in FIG. 2. This also displays a user interface to the user shoring the number of sections, names of the sections, and number of possible questions for each section. FIG. 3 is a diagram illustrating this user interface. After the user enters the number of questions to be selected (assume 20 from the "BASIC-JAVA" section and 10 from each of the others for a total of 60), the following streaming output of the process of recognizing the input may occur:

```
Getting PICK questions in all sections
20 questions to be selected from "BASIC-JAVA" section.
```

10 questions to be selected from "ENTERPRISE-JAVA" section.
10 questions to be selected from "GUI-JAVA" section.
10 questions to be selected from "SHELL-SCRIPTS-QA" section.
10 questions to be selected from "CPLUSPLUS-PROGRAMMING" section.
Frame created . . .
Window Listener associated . . .
Question panel added . . .
Files panel added . . .
Total questions selected: 60

Following this, the random selection of nodes may occur. What follows is a streaming output representing that process:

Generate button clicked
10 82
10 13
10 14
10 27
10 30
You need to select "50" questions.
You've selected "50" questions.
And you got it right!
Repository: jsW-test.xml
Question XSL Script: jsw__test.xsl
Question Output Script: question.html
Answer XSL Script: jsw__answer.xsl
Answer Output Script: answer.html
question.html
File extension: .html
answer.html
File extension: .html
DOM re-generated.
There are 5 section node(s).
There are 82 question nodes
Selecting 10 out of total 82 nodes . . .
Copying nodes from the original DOM tree . . .
Copying the 65th node
Copying the 27th node
Copying the 17th node
Copying the 77th node
Copying the 14th node
Copying the 64th node
Copying the 20th node
Copying the 30th node
Copying the 48th node
Copying the 73th node
Nodes copied.
There are 13 question nodes
Selecting 10 out of total 13 nodes . . .
Copying nodes from the original DOM tree . . .
Copying the 10th node
Copying the 9th node
Copying the 7th node
Copying the 12th node
Copying the 1th node
Copying the 6th node
Copying the 4th node
Copying the 8th node
Copying the 3th node
Copying the 11th node
Nodes copied.
There are 14 question nodes
Selecting 10 out of total 14 nodes . . .
Copying nodes from the original DOM tree. . .
Copying the 2th node
Copying the 9th node
Copying the 5th node
Copying the 11th node
Copying the 0th node
Copying the 6th node
Copying the 13th node
Copying the 4th node
Copying the 3th node
Copying the 8th node
Nodes copied.
There are 27 question nodes
Selecting 10 out of total 27 nodes . . .
Copying nodes from the original DOM tree . . .
Copying the 21th node
Copying the 12th node
Copying the 8th node
Copying the 4th node
Copying the 24th node
Copying the 15th node
Copying the 3th node
Copying the 23th node
Copying the 14th node
Copying the 20th node
Nodes copied.
There are 30 question nodes
Selecting 10 out of total 30 nodes . . .
Copying nodes from the original DOM tree . . .
Copying the 5th node
Copying the 0th node
Copying the 8th node
Copying the 20th node
Copying the 9th node
Copying the 23th node
Copying the 24th node
Copying the 1th node
Copying the 26th node
Copying the 16th node
Nodes copied.

Figure 4:
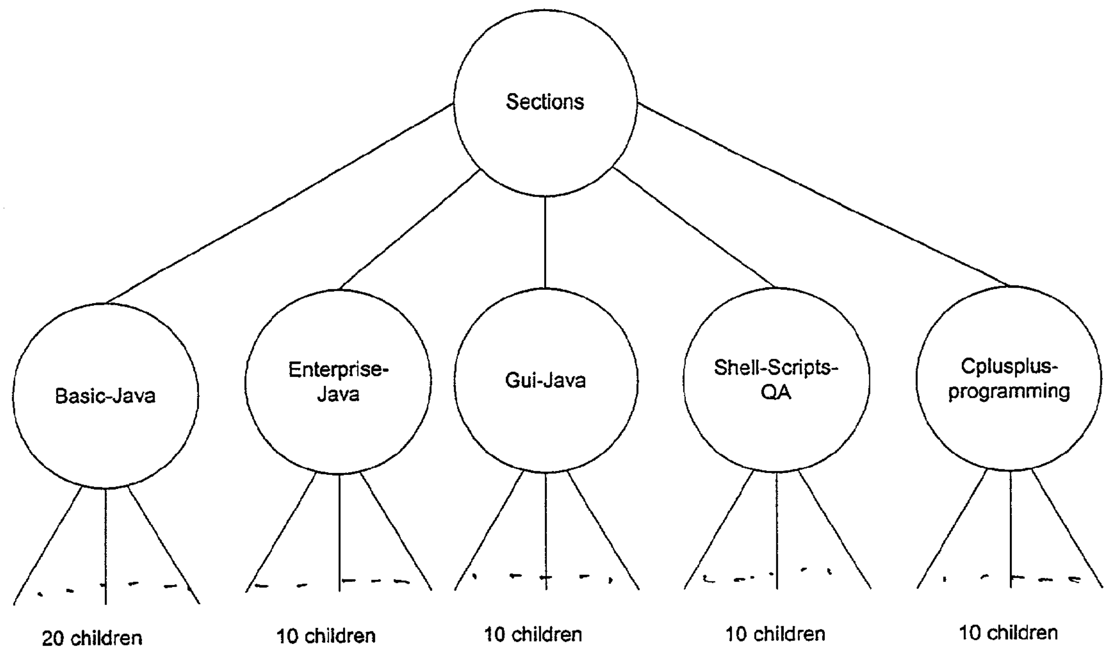
FIG. 4 is a diagram illustrating an example of a second DOM tree in accordance with a specific embodiment of the present invention.

This produces a second DOM tree as depicted in FIG. 4. Finally, the XSL transformation may be applied, resulting in the following formatted question sheet in HTML format:

```
<html>
<head>
<META http-equiv="Content-Type" content="text/html; charset=UTF-8">
<title>Java Software Written Test</title>
</head>
<body>
<Hl>1nstructions</H1>
<ol>
<li>Please do not write on this booklet</li>
<li>Choose one correct answer, unless otherwise specified</li>
<li>Mark your answers on the answer booklet provided</li>
<li>Source code in question statements is marked as a numbered sequence</li>
<li>Write your name, e-mail address and contact phone number on the answer booklet</li>
<li>Correct answers carry TWO marks</li>
<li>Wrong answers carry ONE NEGATIVE mark</li>
<li>Duration 1 hour</li>
</ol>
<center>
<H1>1.0 Java Programming</H1>
<H3>Basic Java Concepts</H3>
</center>1.1<b><font style="font-size: 14pt;">
```

```
When you invoke a program by passing a class to the Java interpreter, the Java interpreter
</font></b>
<br>
<ol type="a">
<LI>1nvokes your class init ( ) method</LI>
<LI>1nvokes your class starc ( ) method</LI>
<LI>Invokes your class main ( ) method</LI>
<LI>lnvokes the method that you tell it to start at</LI>
<LI>Does not invoke any method but waits for the user interaction</LI>
</ol>
OTHER QUESTIONS GO HERE . . .
<01 type="a">
<LI>Execution will throw core dump</LI>
<LI>65601</L1>
<LI>65</LI>
<LI>A</L1>
</ol>
</body>
</html>
```

The following formatted answer document may also be creating using the XSL transformation:

```
<html>
<head>
<META http-equiv="Content-Type" content="text/html; charset=UTF-8">
<title>Java Software Written Test</title>
</head>
<body>
<center>
<Hl>Java Programming</H1>
</center>1.1 c.<br>1.2 c.<br>1.3 b.<br>1.4 e.<br>1.5 b.<br>1.6 c.<br>1.7 b.<br>1-8 c-<br>1.9 e.<br>1.10 d.<br>
<center>
<H1>Enterprise Java Programming</H1>
</center>2.1 c.<br>2.2 d.<br>2.3 c.<br>2.4 c-<br>2.5 c.<br>2.6 a<,br>2.7 a.<br>2.8 d.<br>2.9 b.<br>2.10 d.<br>
<center>
<H1>-Java GUI Progranming</H1>
</center>3.1 c.<br>3.2 c.<br>3.3 c.<br>3.4 b.<br>3.5 b.<br>3.6 d.<br>3.7 b.<br>3.8 c.<br>3.9 b.<br>3.10 c.<br>
<center>
<H1>Shell Scripts & QA</H1>
</center>4.1 a.<br>4.2 b.<br>4.3 c.<br>4.4 b.<br>4.5 d.<br>4.6 d.<br>4.7 c.<br>4.8 c.<.br>4.9 a.<br>4.10 c.<br>
<center>
<H1>C++ and Programming</H1>
</center>5.1 c.<br>5.2 c.<br>5.3 d.<br>5.4 b.<br>5.5 c.<br>5.6 b.–<br>5.7 c.–<br>5.8 b.<br>5.9 a.<br>5.10 d.<br>
</body>
</html>
```

Figure 5:
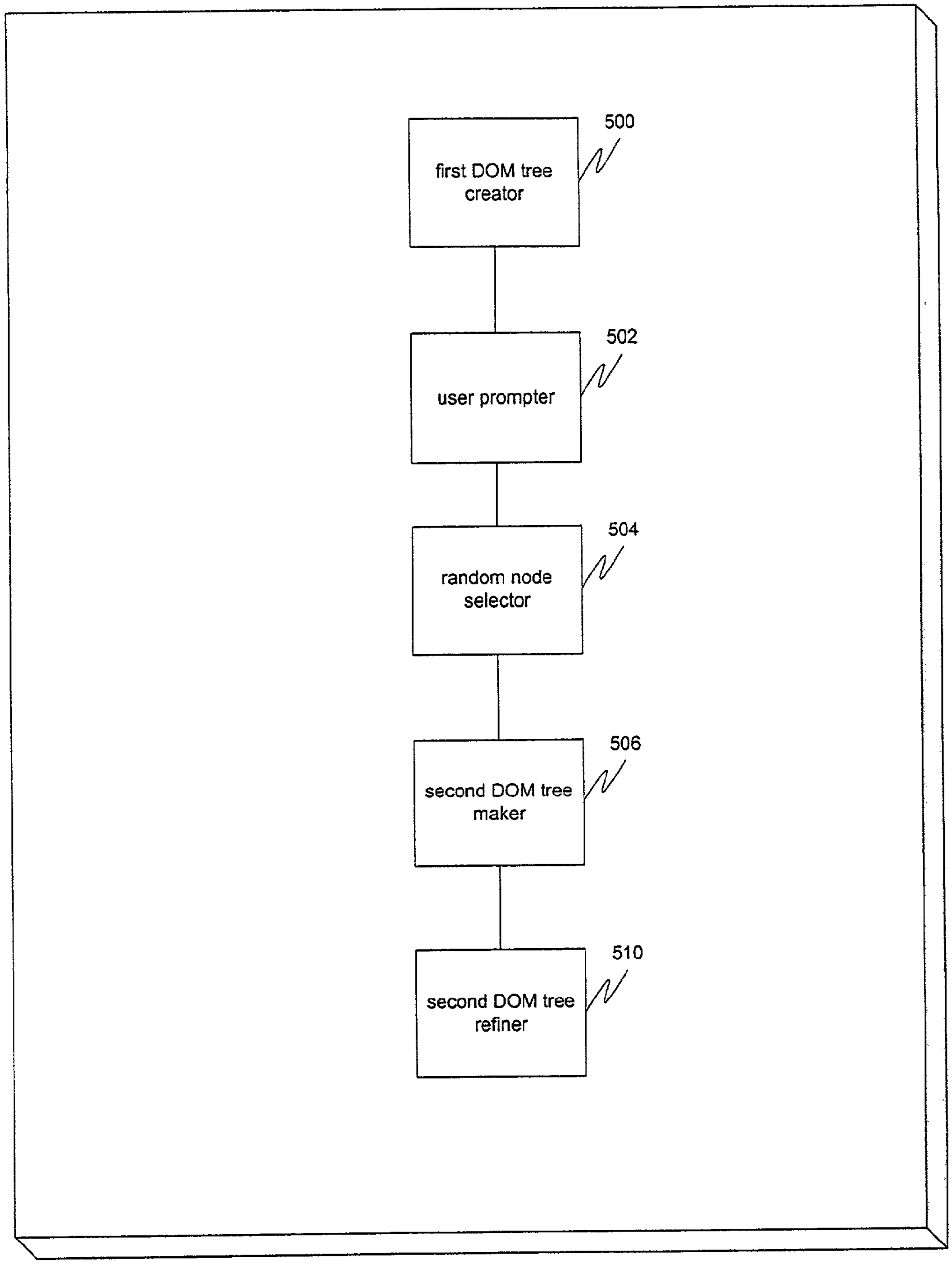
FIG. 5 is a block diagram illustrating an apparatus for generating a question document and an answer document from a database of questions and answers in accordance with a specific embodiment of the present invention.

FIG. 5 is a block diagram illustrating an apparatus for generating a question document and an answer document from a database of questions and answers in accordance with a specific embodiment of the present invention. The database of question and answers may be in XML format. A DTD may be defined to define the XML document.

A first DOM tree creator 500 creates a first DOM tree of the entire question bank. This may be accomplished using a parsing tool, such as Java API for XML Parsing (JAXP). A user prompter 502 coupled to the first DOM tree creator 500 prompts the user to enter the number of questions from each section that should be on the test.

A random node selector 504 coupled to the user prompter 502 randomly selects a number of nodes from the first DOM tree. The number of nodes and the sections from which they are selected are based on the inputs provided by the user in response to the user prompter 502. A second DOM tree maker 506 coupled to the random node selector 504 makes a second DOM tree from the randomly selected nodes. This second DOM tree represents the final question and answer sheet. However, since it is unlikely that a user will wish to use the second DOM tree directly, a second DOM tree refiner 508 coupled to the second DOM tree maker 506 applies an stylesheet language transformation, such as an Extensible Stylesheet Language (XSL) transformation, to the second DOM tree, which converts it to a more user-friendly and printable format, such as Hypertext Markup Language (HTML) or other web presentation language.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-implemented method for generating a question document and an answer document from a database of questions, the database of questions and answers contained in an extensible markup language document, wherein the questions and answers are divided into sections, the method comprising:

creating a first Document Object Model (DOM) tree from the extensible markup language document containing said database of questions and answers, said DOM tree containing nodes for each of the sections and each question and answer in the database;

prompting a user to indicate a number for each of the sections, said number representing how many questions from each of the sections should be chosen;

randomly selecting a number of nodes from each of the sections in said first DOM tree wherein said number of nodes is said number for each of the sections;

making a second DOM tree from said randomly selected nodes; and refining said second DOM tree into a question document and an answer document.

2. The method of claim 1, wherein the extensible markup language document containing said database of questions and answers is created by porting a word processing document into extensible markup language format using a predefined Document Type Definition (DTD).

3. The method of claim 1, wherein the extensible markup language document is in a format defined by a Document Type Definition (DTD), said DTD splitting the questions and answers into sections, defining the questions as elements and the answers as attributes to said elements.

4. The method of claim 1, wherein said refining includes applying an stylesheet language transformation to said second DOM tree to get the question document and the answer document.

5. The method of claim 4, wherein said stylesheet language transformation creates the question document in a web presentation language and the answer document in said web presentation language.

6. The method of claim 1, wherein said creating a first DOM tree from the extensible markup language document includes using a parsing tool.

7. An apparatus for generating a question document and an answer document from a database of questions, the database of questions and answers contained in an Extensible Markup Language (extensible markup language) document, wherein the questions and answers are divided into sections, the apparatus comprising:

means for creating a first DOM tree from the extensible markup language document containing said database of questions and answers, said DOM tree containing nodes for each of the sections and each question and answer in the database;

means for prompting a user to indicate a number for each of the sections, said number representing how many questions from each of the sections should be chosen;

means for randomly selecting a number of nodes from each of the sections in said first DOM tree wherein said number of nodes is said number for each of the sections;

means for making a second DOM tree from said randomly selected nodes; and means for refining said second DOM tree into a question document and an answer document.

8. The apparatus of claim 7, wherein the extensible markup language document containing said database of questions and answers is created by porting a word processing document into extensible markup language format using a predefined Document Type Definition (DTD).

9. The apparatus of claim 7, wherein the extensible markup language document is in a format defined by a Document Type Definition (DTD), said DTD splitting the questions and answers into sections, defining the questions as elements and the answers as attributes to said elements.

10. The apparatus of claim 7, wherein said refining includes applying a stylesheet language transformation to said second DOM tree to get the question document and the answer document.

11. The apparatus of claim 10, wherein said stylesheet language transformation creates the question document in a web presentation language and the answer document in said web presentation language.

12. The apparatus of claim 7, wherein said means for creating a first DOM tree from the extensible markup language document includes using a parsing tool.

13. A program storage device readable by a machine, tangibly embodying a program of instructions executable by the machine to perform a method for generating a question document and an answer document from a database of questions, the database of questions and answers contained in an Extensible Markup Language (extensible markup language) document, wherein the questions and answers are divided into sections, the method comprising:

creating a first DOM tree from the extensible markup language document containing said database of questions and answers, said DOM tree containing nodes for each of the sections and each question and answer in the database;

prompting a user to indicate a number for each of the sections, said number representing how many questions from each of the sections should be chosen;

randomly selecting a number of nodes from each of the sections in said first DOM tree wherein said number of nodes is said number for each of the sections;

making a second DOM tree from said randomly selected nodes; and refining said second DOM tree into a question document and an answer document.

* * * * *